Figure 1:
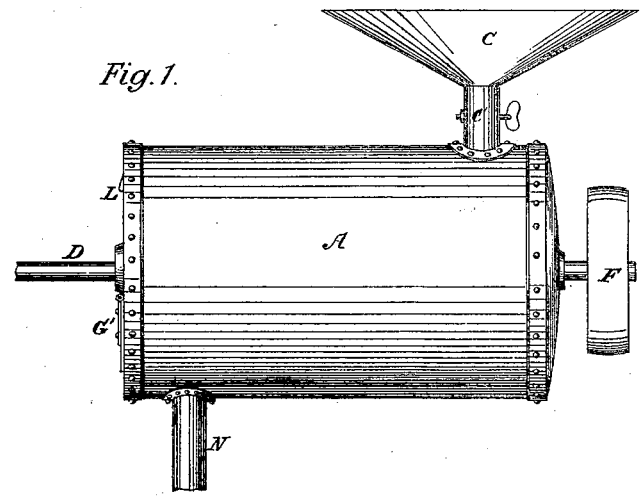

G. W. WAITT.
Improvement in Roasted Wheat.

No. 114,891.  Patented May 16, 1871.

Witnesses:
Fred. Artos.
D. C. Colby

Inventor:
Geo. W. Waitt
By D. C. Colby & Son,
Attorneys

UNITED STATES PATENT OFFICE.

GEORGE W. WAITT, OF PHILADELPHIA, PENNSYLVANIA, ASSIGNOR TO HIMSELF AND ROBERT B. FITTS, OF SAME PLACE.

IMPROVEMENT IN ROASTED WHEAT.

Specification forming part of Letters Patent No. 114,891, dated May 16, 1871.

*To whom it may concern:*

Be it known that I, GEORGE W. WAITT, of Philadelphia, in the county of Philadelphia and State of Pennsylvania, have, as I believe, invented new and useful Improvements in Methods of Roasting Wheat and other Grain and putting it up as food; and I do hereby declare the following to be a full and exact description of the same, reference being had to the drawing that accompanies and forms a part of this specification.

The object of my invention is to render the hulls of wheat-kernels friable and easily digestible, and to fit the entire grain for the human stomach, that the inherent nutritious elements may be brought to the most favorable conditions to render their appropriate service as human food.

My invention consists in the treatment of grain to the action of dry pure air and dry heat in a chamber arranged for rapid evaporation, and also for a high degree of heat, without scorching and without evaporating the desirable flavoring-oils it contains, changing the characteristics of the constituent elements in manner and under the range of temperature hereinafter set forth, and for the purposes specified.

Preferably I use a chamber surrounded with steam-chest. On opening the chamber to charge it with grain the temperature would ordinarily be 100° to 120° Fahrenheit, from which it is gradually raised, the grain being kept in motion by stirring or otherwise, and subjected to action of a free current of air passing through the chamber to evaporate the moisture and remove any vaporous impurities that might be present, this air-current being shut off at about 212°, and the dry heat continued to 280° to 285° in the now close chamber, converting a portion of the starch into dextrine, causing the particles of gluten in the hull to separate, and the whole kernel rendered so friable as to be easily pulverized.

A very good and convenient apparatus for carrying out my invention with promptness and certainty is one after the general construction of that illustrated in the drawing furnished herewith, in which—

Figure 2:
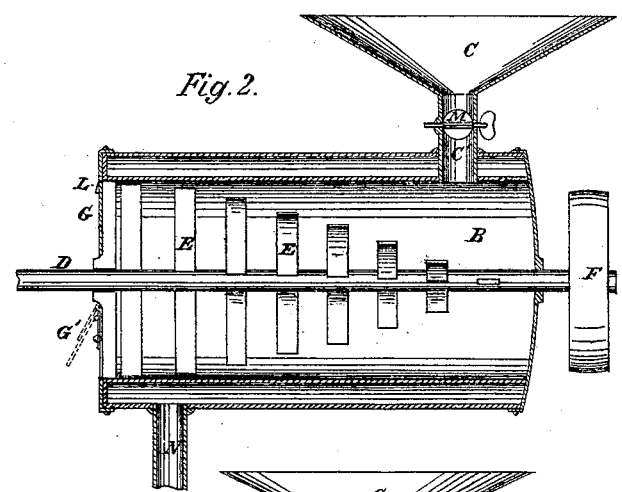
Figure 3:
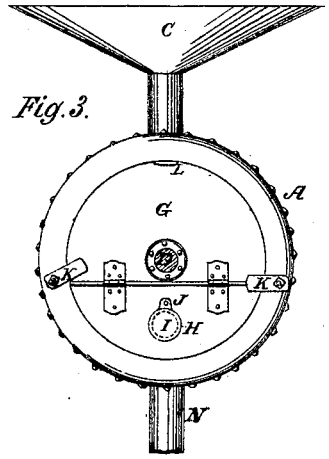

Figure 1 is a side elevation of steam-chest and some other parts; Fig. 2, longitudinal vertical section, exhibiting interior parts; Fig. 3, an end view, presenting the removable head of the oven.

Letter A, the steam-chest; B, a chamber encompassed by the steam-chest save at one end; C, the hopper or measure from which the grain is fed into the roasting-chamber B; D, a shaft running centrally through chamber B; E, rows of paddle-shaped arms arranged spirally on shaft D, or in any other manner to be effectual in stirring and keeping the contents of the chamber in motion as the shaft D is revolved; F, a pulley for driving the shaft D; G, the removable end of chamber B, the lower part of which is hung upon hinges, so it may be swung up, as in Fig. 2; H, an opening in head G for the free admission of air; I, a pendent cover swinging on pin J, and arranged for graduation, partially or wholly closing opening H; K, two buttons keeping the head G in position; L, a lip keeping the upper portion of head G; M, a damper or regulator to close the passage to hopper C; N, pipe supplying the steam.

My mode of treatment is as follows: Having a free supply of steam in the space O, I fill measure C, and then turn the shut-off M so as to let the grain descend into chamber B, the temperature of which should be reduced to 100° or 120°, or thereabout, which is very proper for the commencement of the torrefying process.

As a means of evaporating the moisture present and carrying off any foreign vapors that might militate against purity and sweetness in the treated grain, I supply a constant incoming current of dry pure air, which passes away through funnel C'.

In the continuance of the treatment I carry up the heat to 212°—boiling-point—and as there is still much water in the grain, it becomes partially steam-cooked. From this point, pressing on the treatment, I raise the temperature until steam no longer passes off from C', and then close damper M and the ingress for the air at H, and let the heat in chamber B rise to 280° to 285° Fahrenheit, when the hull will have been rendered friable, its glutinous quality overcome, and the whole kernel susceptible of being reduced to any desired degree of fineness, and the contents of the chamber are removed, cooled, and put up, either in the whole kernel or more or less comminuted, in suitable form for commerce and the consumer.

As more or less of the starch has been converted to dextrine and the phosphatic elements retained, the resultant article of our treatment is, in dietetic economy, of the very greatest service.

To guard against scorching, and to bring all the contents of the chamber alike under the influence of heat, proper stirring or agitation of the grain is kept up during the process of treatment.

I do not claim any definite form of apparatus for carrying out my improvements, as my invention consists in manner and extent of applying in conjunction both the drying agent and the calorific principle.

I do not claim roasting wheat or the application of the calorific principle, for the development of nutritious and digestible properties in grain by torrefaction has long been recognized.

What I do claim as my invention, and desire to secure by Letters Patent, is—

1. The within-described process of treating wheat to air-currents and dry heat, as and for the purposes specified.

2. As a new commercial article, wheat when treated as hereinbefore described, furnished to the public either as the whole kernel or more or less comminuted.

In testimony whereof I have signed my name to this specification in the presence of two subscribing witnesses.

GEO. W. WAITT.

Witnesses:
CHAS. C. WAITT,
WM. L. KITE.